(12) United States Patent
Kang et al.

(10) Patent No.: US 11,535,095 B2
(45) Date of Patent: Dec. 27, 2022

(54) POWER TRANSMISSION DEVICE FOR HYBRID VEHICLE

(71) Applicant: Hyundai Transys Inc., Hwaseong-si (KR)

(72) Inventors: Hyo Eun Kang, Hwaseong-si (KR); Sang Woo Baek, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 128 days.

(21) Appl. No.: 17/115,280

(22) Filed: Dec. 8, 2020

(65) Prior Publication Data

US 2021/0323395 A1 Oct. 21, 2021

(30) Foreign Application Priority Data

Apr. 16, 2020 (KR) .................. 10-2020-0046313

(51) Int. Cl.
*B60K 6/26* (2007.10)
*B60K 6/38* (2007.10)
(Continued)

(52) U.S. Cl.
CPC ............... *B60K 6/405* (2013.01); *B60K 6/26* (2013.01); *B60K 6/38* (2013.01); *F16F 15/1428* (2013.01);
(Continued)

(58) Field of Classification Search
CPC . B60K 6/405; B60K 6/26; B60K 6/38; B60K 2006/266; B60K 2006/268; B60K 6/387; B60K 6/40; B60K 6/442; B60K 2006/4825; B60K 6/48; B60K 6/485; B60K 6/36; B60K 6/54; F16F 15/1428; F16F 15/063; F16H 57/02; F16H 2057/02034; F16H 2057/02043; H02K 7/02;
(Continued)

(56) References Cited

U.S. PATENT DOCUMENTS

2003/0106729 A1* 6/2003 Noreikat ................ B60K 6/442
903/952
2006/0225984 A1* 10/2006 Tanishima ............ F16F 15/123
192/55.61
(Continued)

FOREIGN PATENT DOCUMENTS

KR 10-2009-0020791 A 2/2009
KR 10-2013-0065392 A 6/2013

OTHER PUBLICATIONS

Office Action dated Apr. 19, 2021 in Korean Application No. 10-2020-0046313.

*Primary Examiner* — Tinh Dang
(74) *Attorney, Agent, or Firm* — Saliwanchik, Lloyd & Eisenschenk

(57) ABSTRACT

A power transmission device for a hybrid vehicle may include: a cover part mounted on a vehicle body; two motor parts embedded in the cover part; two rotor parts mounted in the respective motor parts and rotated; a transfer part selectively connected to the rotor part; a torsion damper part coupled to the transfer part; a clutch part configured to selectively connect any one of the rotor parts to the transfer part; and an output part connected to the clutch part and configured to discharge power to a transmission, wherein any one of the rotor parts is connected to the torsion damper part.

7 Claims, 2 Drawing Sheets

(51) Int. Cl.
*B60K 6/405* (2007.10)
*F16H 57/02* (2012.01)
*F16F 15/14* (2006.01)
*H02K 7/10* (2006.01)
*H02K 7/02* (2006.01)
*H02K 16/00* (2006.01)

(52) U.S. Cl.
CPC .............. *F16H 57/02* (2013.01); *H02K 7/02* (2013.01); *H02K 7/10* (2013.01); *H02K 16/005* (2013.01); *B60Y 2200/92* (2013.01); *B60Y 2400/46* (2013.01); *B60Y 2400/48* (2013.01); *F16H 2057/02034* (2013.01); *F16H 2057/02043* (2013.01)

(58) Field of Classification Search
CPC ........ H02K 7/10; H02K 16/005; H02K 16/00; H02K 7/006; B60Y 2200/92; B60Y 2400/46
See application file for complete search history.

(56) References Cited

U.S. PATENT DOCUMENTS

| | | | |
|---|---|---|---|
| 2007/0007059 A1* | 1/2007 | Nomura | B60L 50/61 |
| | | | 180/65.29 |
| 2010/0160103 A1* | 6/2010 | Holmes | B60W 10/08 |
| | | | 475/140 |
| 2014/0111048 A1* | 4/2014 | Garcia | F16H 57/023 |
| | | | 180/65.25 |

\* cited by examiner

POWER TRANSMISSION DEVICE FOR HYBRID VEHICLE

CROSS-REFERENCE TO RELATED APPLICATION

This application claims priority from and the benefit of Korean Patent Application No. 10-2020-0046313, filed on Apr. 16, 2020, which is hereby incorporated by reference for all purposes as if set forth herein.

BACKGROUND

Field

Exemplary embodiments of the present disclosure relate to a power transmission device for a hybrid vehicle, and more particularly, to a power transmission device for a hybrid vehicle, in which a rotor support part can be installed to serve as a portion of a torsion damper part and thus reduce the whole length of the power transmission device even though dual motors are applied, and replace a mass for a damper to reduce the number of parts.

Discussion of the Background

In general, a power transmission device for a hybrid vehicle has a layout in which an automatic transmission, a motor, an engine and an ISG (Integrated Starter & Generator) are arranged in a line.

A hybrid vehicle which uses an engine and motor is started by the motor. When the vehicle is driven at a predetermined speed, a generator, i.e. an ISG starts the engine in order to use the power of the engine and the power of the motor at the same time.

The motor used in the power transmission device for a hybrid vehicle may be driven for electric driving of the vehicle, when the engine is not driven at the initial stage.

Recently, a hybrid vehicle has been developed, which includes two or more motors arranged therein, in addition to the hybrid vehicle including one motor installed therein. For example, when two motors are arranged in a power transmission device for a hybrid vehicle, a first motor may be driven to start an engine, and a second motor may be driven for electric driving of the vehicle.

In the conventional hybrid vehicle, however, a torsion damper which is necessarily used to absorb shock caused by a driving force of the engine is disposed between the motor and the engine. Thus, the whole length of the power transmission device for a hybrid vehicle is increased, and a separate mass for a damper is installed in the torsion damper. Therefore, the number of parts is increased, the manufacturing cost is increased, and the productivity is reduced.

Therefore, there is a need for a device capable of solving the problem.

The related art of the present disclosure is disclosed in Korean Patent Application No. 2009-0020791 published on Feb. 27, 2009 and entitled "Power Transmission Device for Hybrid Vehicle".

SUMMARY

Various embodiments are directed to a power transmission device for a hybrid vehicle, in which a rotor support part can be installed to serve as a portion of a torsion damper part and thus reduce the whole length of the power transmission device even though dual motors are applied, and replace a mass for a damper to reduce the number of parts.

In an embodiment, a power transmission device for a hybrid vehicle may include: a cover part mounted on a vehicle body; two motor parts embedded in the cover part; two rotor parts mounted in the respective motor parts and rotated; a transfer part selectively connected to the rotor part; a torsion damper part coupled to the transfer part; a clutch part configured to selectively connect any one of the rotor parts to the transfer part; and an output part connected to the clutch part and configured to discharge power to a transmission, wherein any one of the rotor parts is connected to the torsion damper part.

The torsion damper part may be disposed between the rotor part and the transfer part.

The cover part may include: a cover outer wall having the motor part mounted therein; and a cover inner wall extended inwardly from the cover outer wall.

The two motor parts may include: a first motor part mounted in the cover part, and driven to start an engine part; and a second motor part mounted in the cover part, and driven to operate the vehicle.

The two rotor parts may include: a first rotor part rotated by the first motor part; and a second rotor part rotated by the second motor part, and selectively connected to the clutch part.

The first rotor part may include: a first rotor rotation part configured to function as a rotor of the first motor part; and a first rotor support part interlocked with the first rotor rotation part and connected to the transfer part, wherein the first rotor support part is connected to the top of the torsion damper part, and bent toward the transfer part 40.

The torsion damper part may include: a torsion spring configured to relieve shock applied to the engine part and the motor part; and a fly wheel connected to the torsion spring and spline-coupled to the transfer part.

In the power transmission device for a hybrid vehicle, the rotor support part can be installed to serve as a portion of the torsion damper part and thus reduce the whole length of the power transmission device even though dual motors are applied, and replace a mass for a damper to reduce the number of parts, thereby relieving shock applied to the engine part and the motor part.

DETAILED DESCRIPTION OF THE ILLUSTRATED EMBODIMENTS

Hereinafter, a power transmission device for a hybrid vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators.

Therefore, definition of the terms should be made according to the overall disclosures set forth herein.

Figure 1:
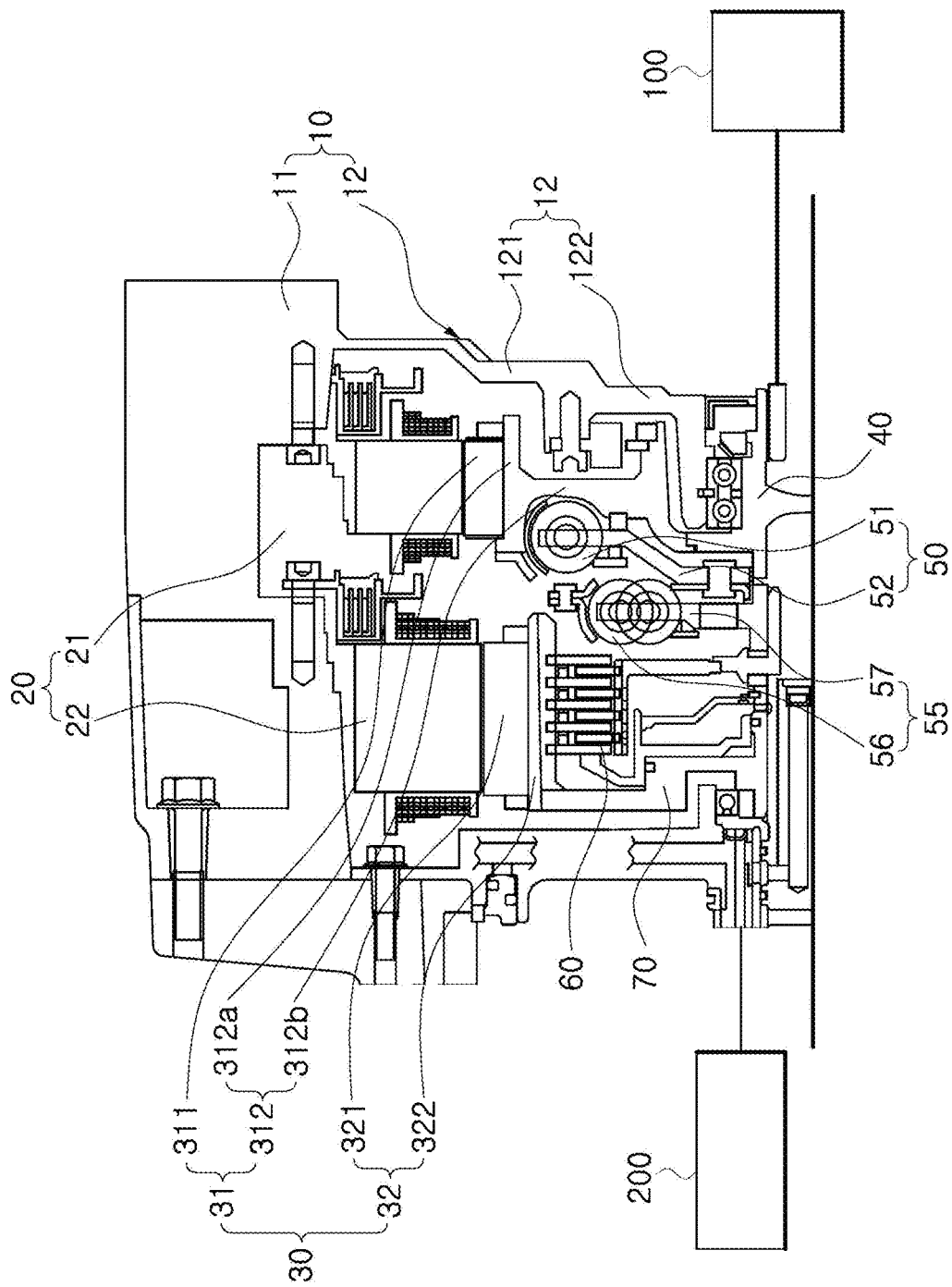
FIG. 1 is a cross-sectional view schematically illustrating a power transmission device for a hybrid vehicle in accordance with an embodiment of the present disclosure.
Figure 2:
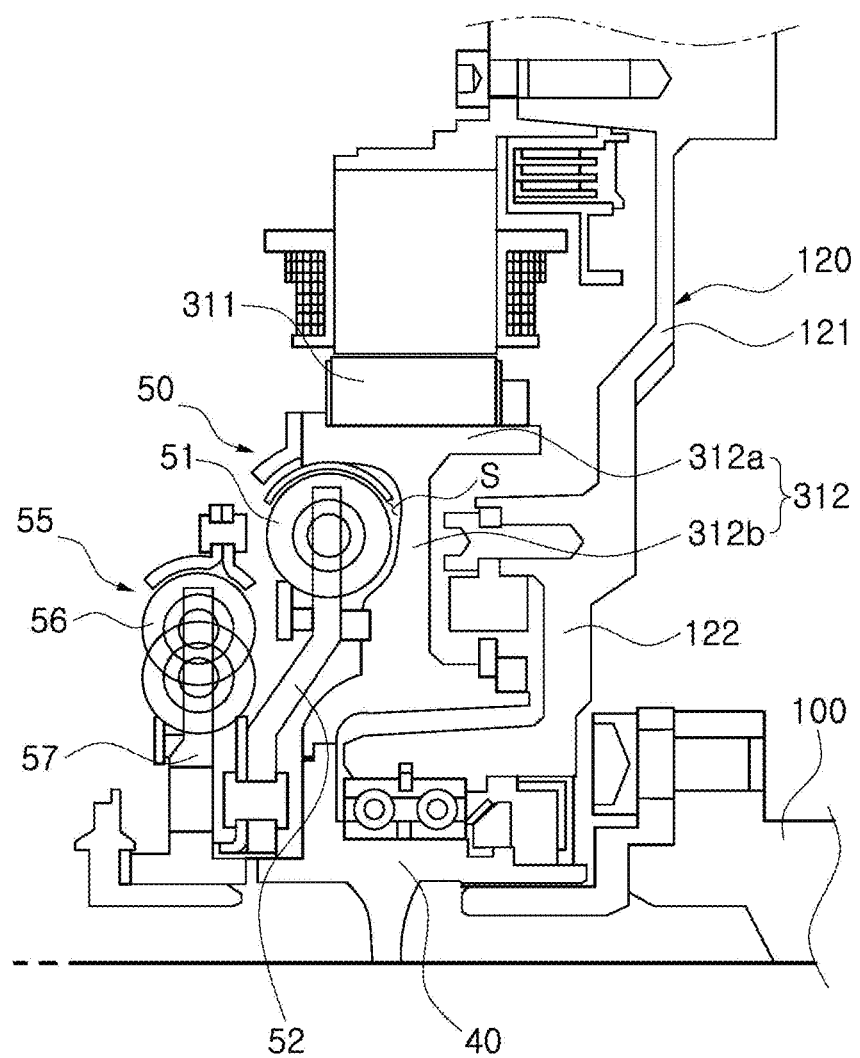
FIG. 2 is a cross-sectional view schematically illustrating a torsion damper part of the power transmission device for a hybrid vehicle in accordance with the embodiment of the present disclosure.

FIG. 1 is a cross-sectional view schematically illustrating a power transmission device for a hybrid vehicle in accordance with an embodiment of the present disclosure, and FIG. 2 is a cross-sectional view schematically illustrating a torsion damper part of the power transmission device for a hybrid vehicle in accordance with the embodiment of the present disclosure. Referring to FIGS. 1 and 2, a power transmission device 1 for a hybrid vehicle in accordance with an embodiment of the present disclosure includes a cover part 10, a motor part 20, a rotor part 30, a transfer part 40, a torsion damper part 50, a clutch part 60 and an output part 70.

The cover part 10 is mounted on a vehicle body. The motor part 20 is embedded in the cover part 10, and driven when power is applied thereto. As the motor part 20, two motor parts may be used. Any one of the two motor parts may be used to start the vehicle, and the other one may be used to drive the vehicle.

The rotor part 30 is mounted in each of the motor parts 20 and rotated.

The transfer part 40 is rotatably connected to the torsion damper part 50. The transfer part 40 may transfer the rotational force of an engine part 100.

A portion of the torsion damper part 50 is spline-coupled to the transfer part 40.

The clutch part 60 selectively connects any one of the rotor parts 30 to the transfer part 40. The output part 70 is connected to the clutch part 60 and discharges power to a transmission 200.

The torsion damper part 50 is disposed between the rotor part 30 and the transfer part 40. That is, the rotor part 30 may be disposed in the motor part 20, the transfer part 40 may be disposed on the rotation center axis of the rotor part 30, and the torsion damper part 50 may be disposed between the rotor part 30 and the transfer part 40, which makes it possible to reduce the whole length of the power transmission device 1 for a hybrid vehicle.

The cover part 10 in accordance with the embodiment of the present disclosure includes a cover outer wall 11 and a cover inner wall 12.

The motor part 20 is mounted in the cover outer wall 11. For example, the cover outer wall 11 may be fixed to the vehicle body, and have an internal space in which the motor part 20, the rotor part 30, the transfer part 40, the torsion damper part 50, the clutch part 60 and the output part 70 are embedded. The cover outer wall 11 may be connected to the transmission 200.

The cover inner wall 12 is extended inwardly from the cover outer wall 11. For example, the cover inner wall 12 may include a first inner wall 121 extended from the cover outer wall 11 and a second inner wall 122 extended from the first inner wall 121.

Oil in the transmission 200 may be introduced into the space between the cover outer wall 11 and the cover inner wall 12, in order to perform a cooling operation.

The motor part 20 in accordance with the embodiment of the present disclosure includes a first motor part 21 and a second motor part 22.

The first motor part 21 is mounted in the cover part 10, and driven to start the engine part 100. For example, the first motor part 21 may be disposed on the left side of the cover inner wall 12, and disposed closer to the engine part 100 than the second motor part 22.

The second motor part 22 is mounted in the cover part 10, and driven to operate the vehicle. For example, the second motor part 22 is disposed on the left side of the first motor par 21, and has a larger capacity than the first motor part 21.

The rotor part 30 in accordance with the embodiment of the present disclosure includes a first rotor part 31 and a second rotor part 32.

The first rotor part 31 is rotated by the first motor part 21. For example, the first rotor part 31 may include a first rotor rotation part 311 functioning as a rotor of the first motor part 21, and a first rotor support part 312 interlocked with the first rotor rotation part 311 and connected to the transfer part 40.

The first rotor support part 312 is connected to the top of the torsion damper part 50, and bent toward the transfer part 40.

The second rotor part 32 is rotated by the second motor part 22, and selectively connected to the clutch part 60. For example, the second rotor part 32 may include a second rotor rotation part 321 functioning as a rotor of the second motor part 22, and a second rotor support part 322 interlocked with the second rotor rotation part 321.

The torsion damper part 50 in accordance with the embodiment of the present disclosure includes a torsion spring 51 configured to relieve shock applied to the engine part 100 and the motor part 20 and a fly wheel 52 connected to the torsion spring 51 and spline-coupled to the transfer part 40.

The first rotor support part 312 includes a horizontal part 312a connected to the first rotor rotation part 311 and connected to the torsion spring 51 located at the top of the torsion damper part 50 and a vertical part 312b bent and extended from the horizontal part 312a toward the transfer part 40 and connected to the transfer part 40. At this time, the vertical part 312b is bent to have a space S in which the torsion spring 51 may be seated.

The torsion damper part 50 may further include an assist damper part 55 disposed on one side thereof. The assist damper part 55 includes an assist torsion spring 56 configured to relieve shock applied to the engine part 100 and the motor part 20, and an assist fly wheel 57 connected to the assist torsion spring 56 and connected to the fly wheel 52 of the torsion damper part 50.

The portion of the first rotor support part 312, connected to the torsion spring 51 located at the top of the torsion damper part 50, may have a larger thickness than the other portion thereof, thereby replacing a mass for a damper according to the related art.

The first rotor support part 312 may be bent and extended toward the transfer part 40, and thus replace a primary fly wheel which constitutes one side portion of the torsion damper part 50 in the related art.

Therefore, since the first rotor support part 312 of the first rotor part 31 in accordance with the embodiment of the present disclosure replaces the primary fly wheel and the mass for a damper which are components of the torsion damper part 50 according to the related art, it is possible to reduce the number of parts.

The assembling process and the operation of the power transmission device for a hybrid vehicle in accordance with the embodiment of the present disclosure, which has the above-described structure, will be described as follows.

The second rotor part 32 is disposed in the second motor part 22, and the clutch part 60 is disposed between the transfer part 40 and the second rotor part 32. At this time, the second motor part 22 is mounted in the cover outer wall 11, and the second rotor part 32 is supported by the cover inner wall 12.

The first rotor part 31 is disposed in the first motor part 21. At this time, the first motor part 21 is mounted in the cover outer wall 11, and the first rotor part 31 is supported by the cover inner wall 12.

Furthermore, the first rotor support part 312 of the first rotor part 31 is coupled to the engine part 100, and the fly wheel 52 on which the torsion spring 51 of the torsion damper part 50 is installed is spline-coupled to the transfer part 40. Then, a damper cover 53 is installed over the fly wheel 52, and one side of the damper cover 53 is coupled to the first rotor support part 312 through welding or the like.

Then, the torsion damper part 50 is disposed in the first rotor part 31.

In the above-described assembly structure, the torsion damper part 50 may be disposed in the first motor part 21, which makes it possible to expect that the whole length of the power transmission device can be reduced. Therefore, since the first rotor support part 312 of the first rotor part 31 replaces the primary fly wheel and the mass for a damper which are components of the torsion damper part 50 according to the related art, it is possible to reduce the number of parts.

When the second motor part 22 is driven, the second rotor part 32 may be rotated, and the output part 70 connected to the clutch part 60 may transfer a rotational force of the second rotor part 32 to the transmission 200, in order to drive the vehicle.

When the engine part 100 is driven, the rotational force of the engine part 100 may be transferred to the transfer part 40 through the torsion damper part 50, and transferred to the output part 70 through the clutch part 60, in order to drive the vehicle.

In the power transmission device 1 for a hybrid vehicle in accordance with the embodiment of the present disclosure, the first rotor support part 312 of the first rotor part 31 may be connected to the torsion damper part 50 and the engine part 100, which makes it possible to reduce the whole length of the power transmission device even though dual motors are applied. Furthermore, since the first rotor support part 312 replaces the primary fly wheel and the mass for a damper according to the related art, the number of parts can be reduced, and shock applied to the engine part and the motor part can be relieved.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A power transmission device for a hybrid vehicle, comprising:
   a cover part mounted on a vehicle body;
   a first motor part and a second motor part, each respectively embedded in the cover part;
   a first rotor part mounted in the first motor part and configured to be rotated;
   a second rotor part mounted in the second motor part and configured to be rotated;
   a transfer part;
   a torsion damper part coupled to the transfer part, the torsion damper part comprising a torsion spring located at the top of the torsion damper part and configured to relieve shock;
   a clutch part configured to selectively connect the second rotor part to the transfer part; and
   an output part connected to the clutch part and configured to discharge power to a transmission,
   wherein the first rotor part comprises a first rotor support part that includes a horizontal part connected to a vertical part, the horizontal part connected to the torsion spring of the damper part, and the vertical part bent and extended from the horizontal part toward the transfer part and connected to the transfer part.

2. The power transmission device of claim 1, wherein the torsion damper part is disposed between the first rotor part and the transfer part.

3. The power transmission device of claim 1, wherein the cover part comprises:
   a cover outer wall having the first motor part and the second motor part mounted therein; and
   a cover inner wall extended inwardly from the cover outer wall.

4. The power transmission device of claim 3, wherein the first motor part is driven to start an engine part; and
   the second motor part is driven to operate the vehicle.

5. The power transmission device of claim 4, wherein the first rotor part is rotated by the first motor part; and
   the second rotor part is rotated by the second motor part.

6. The power transmission device of claim 1, wherein the vertical part of the first rotor support part is bent to have a space in which the torsion spring is seated.

7. The power transmission device of claim 6, wherein the horizontal part of the first rotor support part has a larger thickness than the vertical part of the first rotor support part, thereby configured and adapted to replace a mass for the damper part.

* * * * *